United States Patent
Chen et al.

(10) Patent No.: US 9,037,126 B2
(45) Date of Patent: *May 19, 2015

(54) METHOD AND APPARATUS FOR CONTROLLING RESPONSE TO SERVICE NOTIFICATIONS IN A NETWORK ENVIRONMENT

(71) Applicant: QUALCOMM Incorporated, San Diego, CA (US)

(72) Inventors: An Mei Chen, San Diego, CA (US); Jangwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/853,462

(22) Filed: Mar. 29, 2013

(65) Prior Publication Data

US 2013/0226988 A1 Aug. 29, 2013

Related U.S. Application Data

(63) Continuation of application No. 13/418,210, filed on Mar. 12, 2012, now Pat. No. 8,433,311, which is a continuation of application No. 11/558,858, filed on Nov. 10, 2006, now Pat. No. 8,160,563.

(60) Provisional application No. 60/817,773, filed on Jun. 30, 2006.

(51) Int. Cl.
*H04W 4/06* (2009.01)
*H04W 28/00* (2009.01)
(Continued)

(52) U.S. Cl.
CPC ............... *H04L 67/10* (2013.01); *H04W 28/00* (2013.01); *H04W 4/06* (2013.01); *H04W 68/02* (2013.01); *G06F 8/60* (2013.01); *H04L 12/1895* (2013.01); *H04L 67/06* (2013.01); *H04L 67/34* (2013.01)

(58) Field of Classification Search
None
See application file for complete search history.

(56) References Cited

U.S. PATENT DOCUMENTS 6,021,433 A 2/2000 Payne et al.
6,999,742 B2 2/2006 Fang
(Continued)

FOREIGN PATENT DOCUMENTS

CN 1217800 A 5/1999
JP 2001224082 A 8/2001
(Continued)

OTHER PUBLICATIONS

International Preliminary Report on Patentability—PCT/US07/071498, The International Bureau of WIPO—Geneva, Switzerland, Jan. 6, 2009.
(Continued)

*Primary Examiner* — Philip Sobutka
(74) *Attorney, Agent, or Firm* — The Marbury Law Group, PLLC

(57) ABSTRACT

A method of providing content notifications to devices in a wireless communication system includes obtaining notification information regarding content available to a first group of mobile devices in a wireless network, generating a notification message comprising the notification information and an identifier associated with a second group of mobile devices that is a subset of the first group, and broadcasting the notification message over the network to cause mobile devices of the second group to retrieve the content over the network. The method also includes receiving content notifications in a wireless communication system, including receiving a notification message comprising notification information regarding content available to a first group of mobile devices and an identifier associated with a second group of devices, where the second group is a subset of the first group, and retrieving content from a network in response to being one of the second group of devices.

47 Claims, 8 Drawing Sheets

(51) Int. Cl.
*H04W 68/02* (2009.01)
*H04L 29/08* (2006.01)
*H04L 12/18* (2006.01)
*G06F 9/445* (2006.01)

(56) References Cited

U.S. PATENT DOCUMENTS

| | | | |
|---|---|---|---|
| 8,160,563 B2 * | 4/2012 | Chen et al. | 455/419 |
| 8,433,311 B2 * | 4/2013 | Chen et al. | 455/419 |
| 2001/0019951 A1 | 9/2001 | Haumont et al. | |
| 2003/0186689 A1 | 10/2003 | Herle et al. | |
| 2006/0040541 A1 | 2/2006 | Vaughn | |
| 2008/0039008 A1 | 2/2008 | Chen et al. | |
| 2012/0173722 A1 | 7/2012 | Chen et al. | |

FOREIGN PATENT DOCUMENTS

| | | |
|---|---|---|
| JP | 2003051827 A | 2/2003 |
| JP | 2004135293 A | 4/2004 |
| JP | 2007515102 A | 6/2007 |
| WO | 2005048604 A1 | 5/2005 |

OTHER PUBLICATIONS

International Search Report—PCT/US07/071498, International Searching Authority—European Patent Office—Dec. 3, 2007.
Luby, et al., "FLUTE—File Delivery over Unidirectional Transport", IETF RFC 3926, Oct. 2004, pp. 1-35.
Taiwan Search Report—TW096123819—TIPO—Mar. 8, 2011.
Written Opinion—PCT/US07/071498, International Searching Authority—European Patent Office, Dec. 3, 2007.

* cited by examiner

# METHOD AND APPARATUS FOR CONTROLLING RESPONSE TO SERVICE NOTIFICATIONS IN A NETWORK ENVIRONMENT

CROSS REFERENCE TO RELATED PATENT APPLICATIONS

This application is a continuation of U.S. patent application Ser. No. 13/418,210, filed Mar. 12, 2012, which is a continuation of U.S. patent application Serial. No. 11/558,858, filed Nov. 10, 2006, now U.S. Pat. No. 8,160,563, which claims the benefit of priority to U.S. Provisional Patent Application Ser. No. 60/817,773, filed Jun. 30, 2006, the entire contents of all of which are hereby incorporated by reference.

BACKGROUND

I. Field

The present application relates generally to the operation of a distribution network, and more particularly, to methods and apparatus for providing service notifications in a network environment.

II. Description of the Related Art

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed and delivered to devices on a network. For example, a communication network may utilize Orthogonal Frequency Division Multiplexing (OFDM) to broadcast content and services from a network server to one or more mobile devices. During operation, distribution system entities would like to notify targeted devices of selected events, such as marketing promotions, price changes, programming changes, or other events of interest to device users. These same entities may also wish to notify devices of application upgrades or other information that may be available for retrieval. Unfortunately, conventional systems may not provide a fast and efficient mechanism to notify targeted devices of events of interest, or to notify devices of application upgrade or other information that may be available for retrieval.

Therefore, it is desirable to have a system that operates to provide notifications of events of interest to targeted devices on a broadcast network. The system should also operate to notify targeted devices of available upgrades or other information and facilitate automatic retrieval of such upgrades or information.

SUMMARY

In one or more aspects, a notification system, comprising methods and apparatus, is provided that operates to provide service notifications in a network environment. For example, the system is operable to provide notifications to targeted devices on a communication network. The system is also operable to notify targeted devices of available upgrades or other information and facilitate automatic retrieval of such upgrades or information.

In an aspect, a method of providing content notifications to devices in a wireless communication system includes obtaining notification information regarding content available to a first group of mobile devices in a wireless network, generating a notification message comprising the notification information and an identifier associated with a second group of mobile devices, where the second group of mobile devices is a subset of the first group of mobile devices, and broadcasting the notification message over the wireless network to cause mobile devices of the second group to retrieve the content over the wireless network.

In another aspect, a method includes receiving content notifications in a wireless communication system, including receiving, in a wireless network, a notification message comprising notification information regarding content available to a first group of mobile devices in the wireless network and an identifier associated with a second group of mobile devices, where the second group of mobile devices is a subset of the first group of mobile devices, and retrieving content from a network in response to being one of the second group of devices.

Further aspects include apparatuses and mobile devices including processors configured to perform operations of the aspect methods disclosed herein. Various embodiments also include apparatuses and mobile devices including means for performing functions of the aspect methods disclosed herein. Various embodiments also include non-transitory computer-readable storage media having stored thereon processor-executable instructions configured to cause a processor to perform operations of the aspect methods disclosed herein.

Other aspects, advantages, and features will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The following description describes aspects of a notification system that operate to notify devices on a broadcast network about events of interest. For example, the system operates to notify targeted devices about marketing promotions, price changes, programming changes, or other events of interest. The system also provides user defined filtering and interactive functionality to facilitate automatic retrieval of upgrades or other information. The system is especially well suited for use in wireless network environments, but may be used in any type of network environment, including but not limited to, communication networks, public networks, such as the Internet, private networks, such as virtual private networks (VPN), local area networks, wide area networks, long haul network, or any other type of network.

Figure 1:
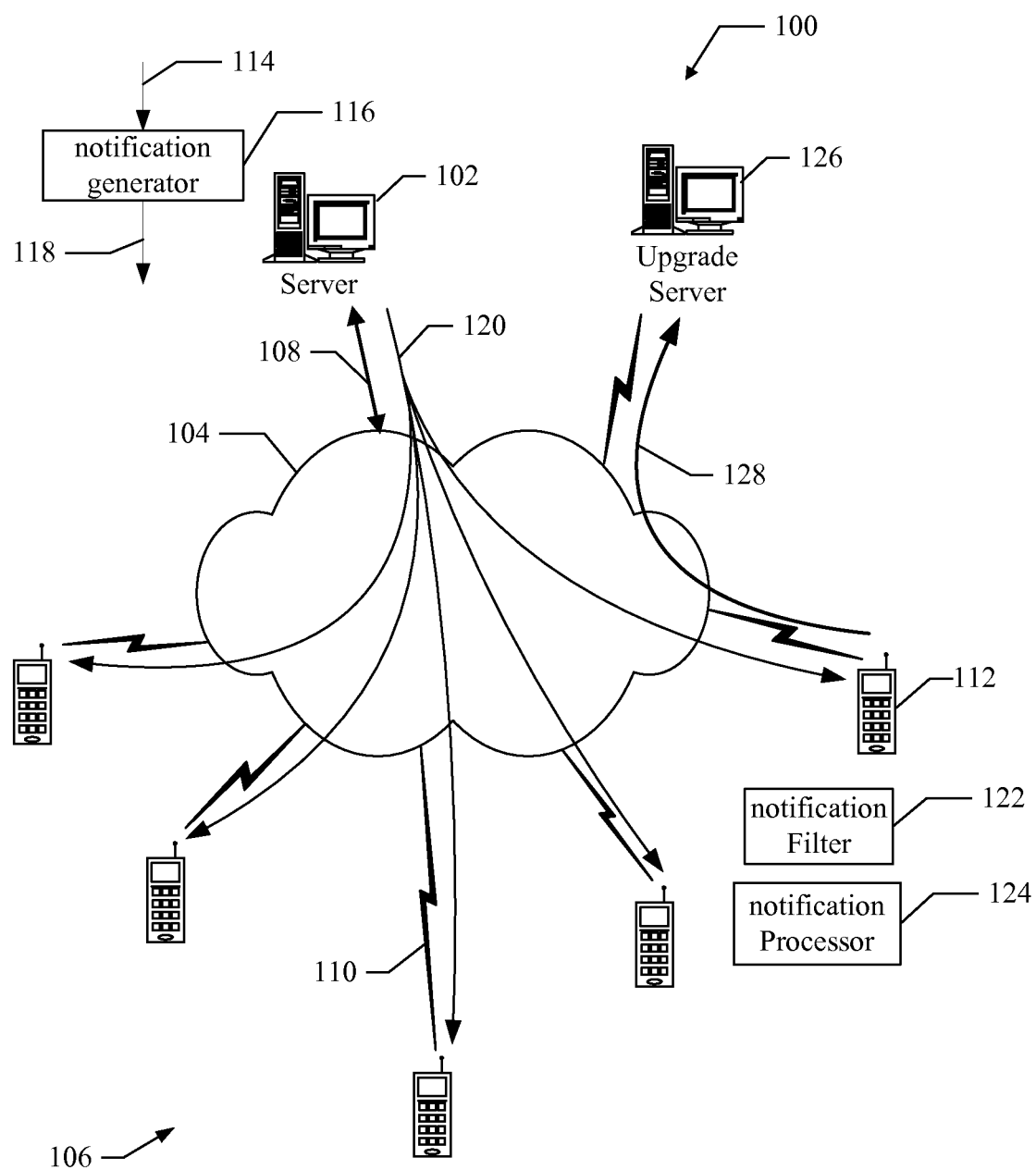
FIG. 1 shows a data network that comprises an aspect of a notification system.

FIG. 1 shows a data network 100 that comprises an aspect of a notification system. The network 100 comprises server 102, data network 104, and a plurality of devices shown generally at 106. The data network 104 may be any type and/or combination of wired and wireless networks that allow data to be transmitted between the server 102 and the devices 106. The server 102 is coupled to the network 104 via the communication link 108, which may be any type of wired and/or wireless communication link that allows the server 102 to communicate with the data network 104. The devices 106 comprise a mobile telephone, PDA, notebook computer, pager, email device, or any other type of device that may operate on the network 104. The devices 106 are in communication with the data network 104 via wireless communication links 110, which allows data to be wirelessly transmitted between the network 104 and the devices 106. In an aspect, the wireless communication links 110 comprises forward communication channels, reverse communication channels, control channels, and any other type of communication channel that may be used to communicate information between the network 104 and the devices 106.

It should also be noted that aspects of the notification system are suitable for use with virtually any number of devices that communicate with the network 104 via wired and/or wireless communication links. For the purpose of this description, the operation of the device 112 will be described in detail; however aspects of the notification system are equally applicable to all the devices shown generally at 106.

During operation, the server 102 receives or otherwise obtains notification information 114 that is to be provided to the devices 106 as notification of one or more conditions or events. For example, the notification information 114 is provided by content providers, content retailers, system administrators or other notification providers or network entities. The notification information 114 comprises marketing promotions, price changes, programming changes, or other events of interest. These same entities may also wish to notify the devices 106 of application upgrades or other information that may be available for retrieval. For example, application upgrades may be available for retrieval from a particular network location.

The system allows operators to create notifications by specifying the scope of the notification and associating it with one or more notification types. A notification message is generated that comprises a message subject and body. The subject is the text title of the notification, and the body is a text message. The notification messages are able to support multiple languages and each notification may comprise multiple messages in different languages. For each message, the language is specified and the subject and body text are provided in that language.

For each notification, a start time and an end time are specified that define a time window during which the notification message will be delivered. After generating a notification message, the notification message can be deleted or modified before the start time of its delivery window. After the start time of a delivery window, however, only the end time of the notification message is modifiable. Each notification message is associated with a sequence number. The sequence number is used by receiving devices to avoid storing duplicate notifications.

The server 102 comprises notification generation logic 116 that operates to receive the notification information 114 and generate one or more notification messages 118. A more detailed description of the format of a notification message is provided in another section of this document. The server 102 then transmits the notification messages 118 over a broadcast channel 120 provided by the network 104. The devices 106 are able to listen on the broadcast channel 120 and receive the notification messages 118.

As illustrated by the device 112, the devices 106 comprise notification filter 122 and notification processor 124. The notification filter 122 operates to filter received notification messages so that only those messages of interest to a particular device are processed. For example, the notification filter 122 operates to filter the notification messages 118 based on sequence number, device model, geographic region, content subscriptions, user defined preferences or any other characteristic or parameter associated with the device 112.

The notification processor 124 operates to process filtered notification messages to determine information that is relevant to a particular device. For example, the information comprises marketing promotions, price changes, programming changes, or other events of interest to that particular device. The notification processor 124 operates to update local system parameters with the new information, render notifications to the device user, or store notifications for later viewing.

In another aspect, the notification messages 118 comprise notifications having interactive functionality. For example, a notification may provide interactive functionality with respect to application upgrades or other information that is available for retrieval. The notification processor 124 operates to determine the location of the available upgrade or information and automatically retrieve that upgrade or information. For example, the device 112 may receive a notification message about a particular application upgrade that is available for retrieval from an upgrade server 126. The notification processor 124 operates to contact the upgrade server 126, as shown at 128, to retrieve the available upgrade or information.

In an aspect, the server 102 operates to generate the notification messages 118 to control a response factor of the devices 106. For example, the notification messages 118 are generated so that a selected number of devices will perform a particular action. The action may be to perform an application upgrade. In an aspect, parameters are included in the notification message 118 that are associated with a selected number of devices, such as a range of device identifiers. When the identified devices receive the notification message 118, they will respond by, for example, retrieving an application update from the update server 126. This mechanism allows the server 102 to control how many devices attempt to access the update server 126 at any particular time so as to avoid network congestion.

Thus, in one or more aspects, a notification system is provided that operates to provide notifications to targeted devices in a network. The system also provides interactive functionality and a mechanism to control how many devices perform selected actions based on a response factor, so as to avoid network congestion. As a result, aspects of the notification system provide a way for devices to be notified of selected events and to perform selected actions in a timely and efficient manner. It should be noted that the network 100 is just one implementation and that other implementations are possible within the scope of the aspects.

Figure 2:
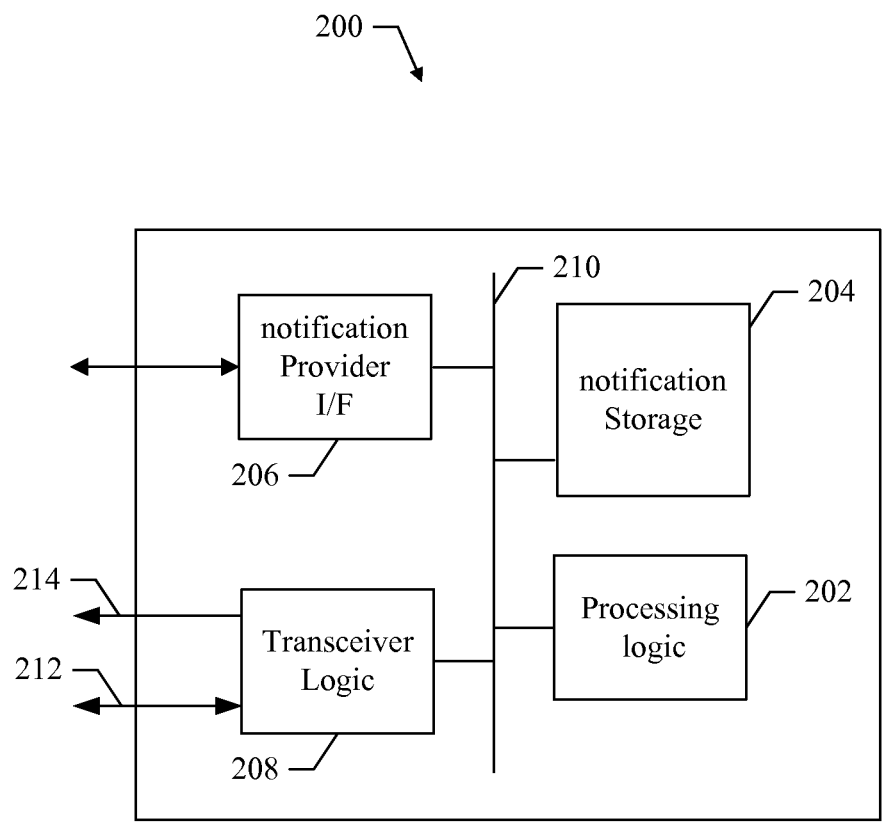
FIG. 2 shows a diagram of a server suitable for use in aspects of a notification system.

FIG. 2 shows a diagram of a server 200 suitable for use in aspects of a notification system. For example, the server 200 may be the server 102 shown in FIG. 1. The server 200 comprises processing logic 202, notification storage 204, notification provider interface (I/F) 206, and transceiver logic 208 all coupled to a data bus 210. It should be noted that the server 200 is just one implementation and that other implementations are possible within the scope of the aspects.

The transceiver logic 208 comprises hardware and/or software that operate to allow the server 200 to communicate data or other information over a network with remote devices or systems. For example, in an aspect, the transceiver logic 208 comprises broadcast logic that operates to broadcast notification messages over a broadcast channel 214. The term "broadcast" is used herein to mean a broadcast, multicast or other transmission over a network that can be received by two or more devices. In an aspect, the transceiver logic 208 also comprises unicast logic to communicate over a unicast channel 212 so that the server 200 may communicate directly over a network with a particular device.

The notification provider interface (I/F) 206 comprises hardware and/or software that operate to allow the server 200 to communicate with notification providers to receive notification information for distribution to devices. For example, the notification providers comprise content providers, content retailers, or any other distribution system entity. The I/F 206 comprises communication logic that allows communication with notification providers over a wired or wireless network link or any other suitable link, such as a direct connect link. The notification storage 204 comprises any suitable memory operable to store notification information received by the notification provider I/F 206.

In one or more aspects, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the data bus 210.

In an aspect, the processing logic 202 operates to generate one or more notification messages for distribution to devices on a network. For example, the notification messages are broadcast over the broadcast channel 212 by the transceiver logic 208. In an aspect, the processing logic 202 operates to generate the notification messages based on a response factor to control how selected devices respond to a notification message. For example, a notification message is generated to identify selected devices that are to contact an upgrade server to retrieve an application upgrade. Thus, the processing logic 202 operates to generate the notification messages to control network congestion by identifying selected groups of devices that are to obtain the upgrade at any particular time.

In an aspect, the following elements are specified for each notification.

a. Notification Type: Notifications can be classified into a large number of types as described below.

b. Notification Scope: The scope of the notifications determines which devices need to process the notifications. For example, for a blackout notification associated with a specific channel, the notification will be processed by the devices that are subscribed to that particular channel. For an application upgrade notification, only those devices that need the application upgrade will process the notification. For an emergency notification, the notification needs to be delivered and processed by all the devices in the network.

c. Notification Delivery Window: The delivery window sets the duration of the notifications to be broadcast in the network.

d. Notification Subject: The subject is the text title of the notification.

e. Notification Body: The body is associated with the mime type to support various types of notifications, e.g., audio, video or image etc. The body could be a simple string, it could contain hyperlinks for users to be interactive, or it could contain multimedia content.

In an aspect, the notification system comprises program instructions stored on a computer-readable medium, which when executed by at least one processor, such as the processing logic 202, operate to provide the functions of the notification system described herein. For example, instructions may be loaded into the server 200 from a computer-readable medium, such as a floppy disk, CDROM, memory card, FLASH memory device, RAM, ROM, or any other type of memory device or computer-readable medium that interfaces to the server 200. In another aspect, the instructions may be downloaded into the server 200 from a network resource that interfaces to the sever 200 via the transceiver logic 208. The instructions, when executed by the processing logic 202, provide one or more aspects of the notification system described herein.

Figure 3:
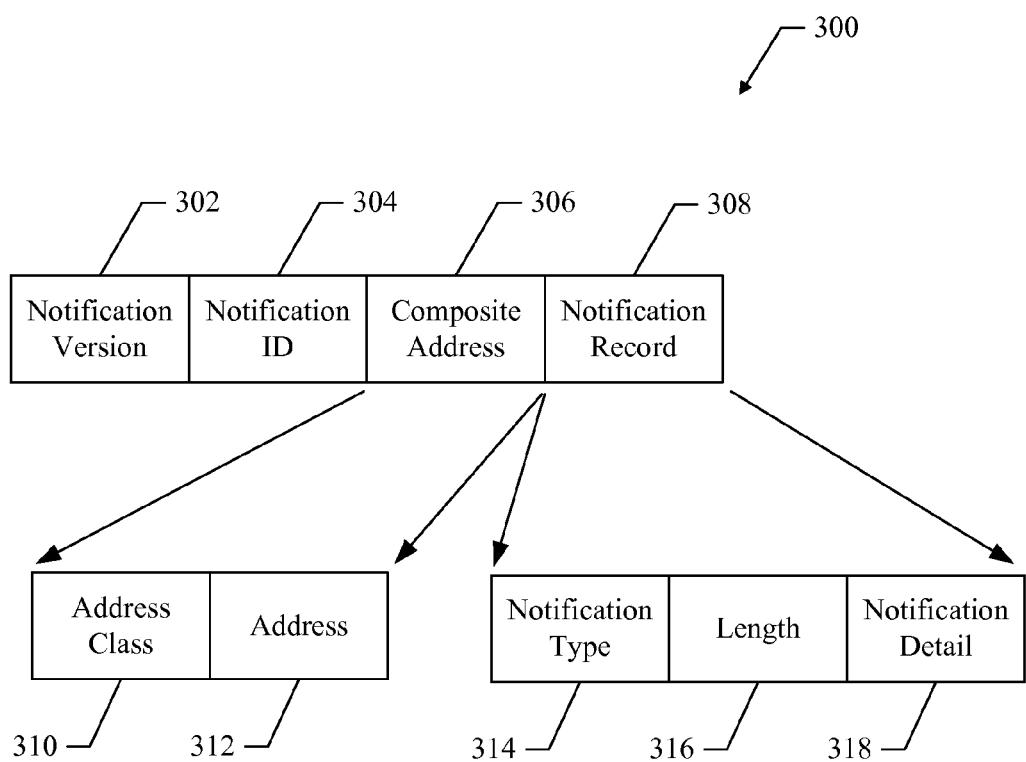
FIG. 3 shows a notification message suitable for use in aspects of a notification system.

FIG. 3 shows a notification message 300 for use in aspects of a notification system. For example, the format of the notification message 300 is suitable for use for the notification messages 118 shown in FIG. 1. In an aspect, the notification message 300 is generated by the processing logic 202 of the server 200. It should be noted that the notification message 300 is just one implementation and that other implementations having more or less information are possible within the scope of the aspects.

The notification message 300 comprises a notification version 302, a notification identifier (ID) 304, a composite address 306, and a notification record 308.

The notification version 302 indicates the current version of the notification message 300. The notification ID 304 identifies the notification message 300.

The composite address 306 operates to address the notification message 300 to one or more targeted devices. For example, a notification message can be sent to a subset of devices as specified by the composite address 306. In an aspect, there are four types of address classes 310, namely; billing and customer service, content retailer, package, and service class. Each address class is associated with one or more addresses 312. However, it should be noted that any number or types of address classes may be used.

In an aspect, the notification record 308 comprises three fields as follows.

a. Notification type (NOTFN_TYPE) field 314
b. Notification Length (LENGTH) field 316
c. Notification Detail (NOTFN_DETAIL) field 318

For example, in a marketplace notification, the text string "MARKETPLACE_NOTIFICATION" is set for the NOTFN_TYPE 314. The LENGTH field 316 indicates the length of the NOTFN_DETAIL field 318 in bytes. The NOTFN_DETAIL field 318 contains the encapsulated notification data. The format of the NOTFN_DETAIL field 318 is provided in another section of this document.

In an aspect, the system operates to periodically send the notification messages over the network. The periodicity at which the notification messages are transmitted depends on a data rate provisioned at the transmitting server. However, it should be noted that the system is operable for use with virtually any periodicity.

Notification Detail Field

Figure 4:
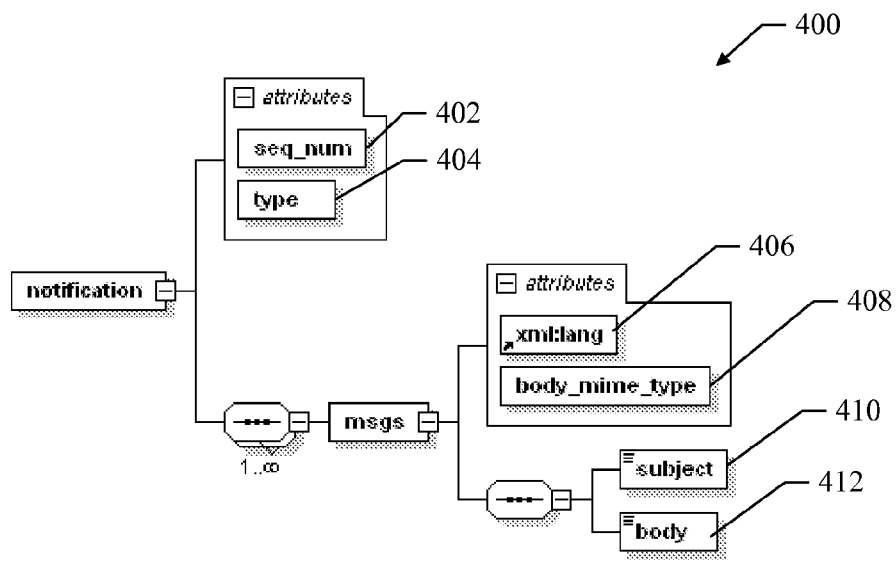
FIG. 4 shows a diagram illustrating a notification detail field for use in aspects of a notification system.

FIG. 4 shows a diagram illustrating a notification detail field 400 for use in aspects of a notification system. In an aspect, the notification detail field 400 is a binary encoded instance of the following XML schema.

Notification Sequence Number (402)

This is a 2-byte unsigned integer sequence number that is incremented by one whenever a new notification is generated.

Notification Type (404)

Figure 5:
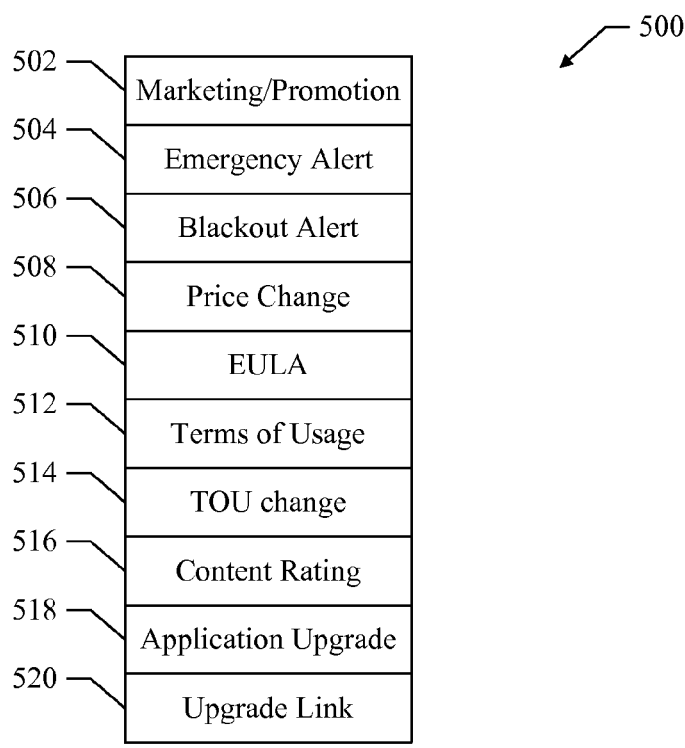
FIG. 5 shows notification types for use in aspects of a notification system.

This 1-byte unsigned integer that specifies the type of notification from one of the types illustrated in FIG. 5.

Notification Language (406)

This specifies the language used for the notification subject and body text.

Notification Body Mime Type (408)

This field indicates the type of the body. For example, the type of the body may be set to "text/plain."

Notification Subject (410)

This is a text string describing the subject of the notification. In an aspect, the maximum length of the subject in characters is defined by a MAX_SUBJECT parameter and may be of any selected length.

Notification Body (412)

This is a text string that describes the notification. The maximum length of the text body in characters is defined by an MAX_BODY parameter and may be of any selected length.

FIG. 5 shows notification type parameters 500 for use in aspects of a notification system. For example, the notification type parameters 500 are suitable for use in the notification detail field 400 shown in FIG. 4. It should be noted that the notification type parameters 500 are provided in just one implementation and that other implementations may provide other type parameters within the scope of the aspects.

The notification type parameters 500 comprise parameters which may be formatted in any suitable format and may be encrypted using any suitable encryption technology. The notification type parameters 500 comprise marketing/promotion parameters 502 that identify particular marketing and promotional notifications. Other parameters provide for an emergency notification 504, a blackout notification 506, a price change notification 508, an end user license agreement (EULA) notification 510, terms of usage notification (TOU) 512, a TOU change notification 514, and a content rating notification 516.

The notification type parameters 500 also comprise an application upgrade notification 518 that identifies a particular application that has been upgraded. Furthermore, an upgrade link 520 is provided that identifies a network location where the application upgrade can be found. Thus, devices receiving the application upgrade notification 518 also received the upgrade link 520 to determine the network location of the upgrade for retrieval. Thus, the application upgrade notification 518 facilitates interactive functionality since a receiving device may automatically retrieve the upgrade at the location specified by the upgrade link 520.

Figure 6:
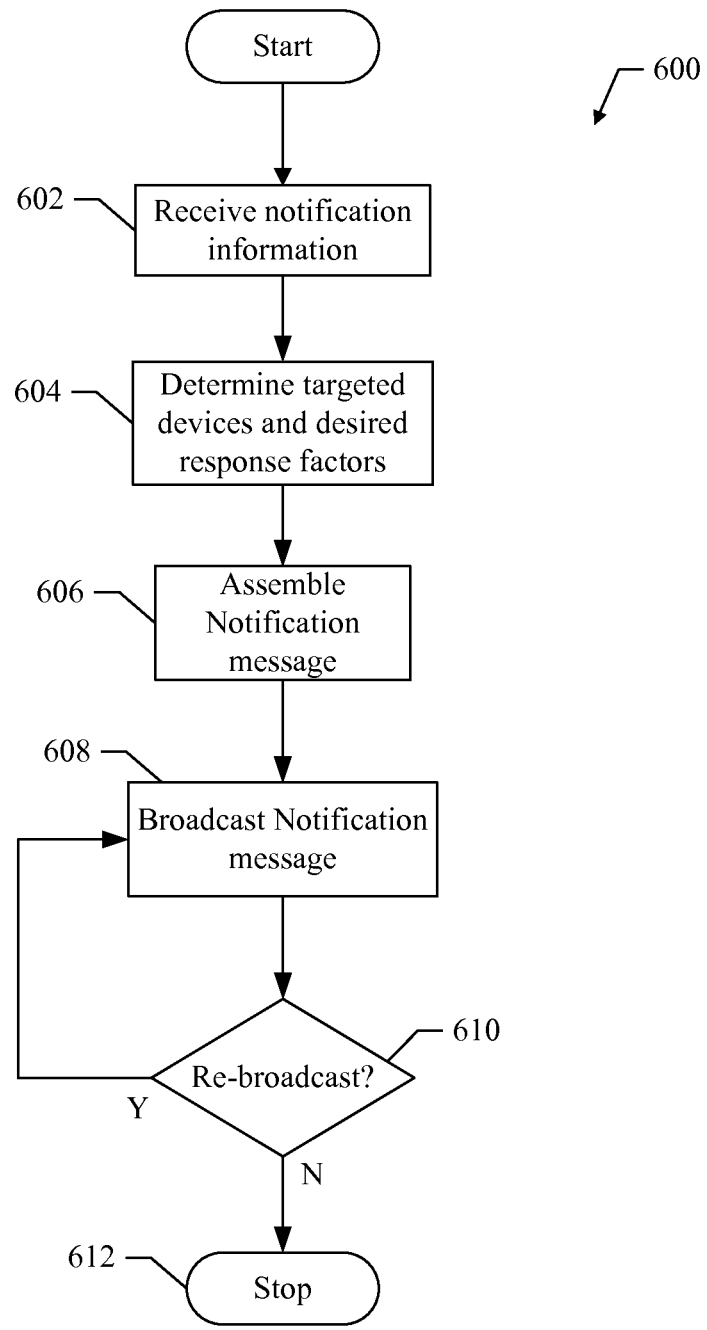
FIG. 6 shows a method for operating a server suitable for use in aspects of a notification system.

FIG. 6 shows a method 600 for operating a server for use in aspects of a notification system. For clarity, the method 600 will be described with reference to the server 200 shown in FIG. 2. In one or more aspects, the processing logic 202 executes program instructions to control the server 200 to perform the functions described below.

At block 602, notification information is received from notification providers. For example, the notification providers comprise content providers, content retailers, application developers, or other distribution system entities. In an aspect, the notification I/F 206 operates to receive the notification information and stores the received information at the notification storage 204.

At block 604, targeted devices and desired response factors are determined. For example, the targeted devices are determined based on device identifiers that are to be included in a notification message. The desired response factors are determined and indicate the number of devices that are to respond to a particular notification, such as an application upgrade notification. For example, an application upgrade notification may be associated with an upgrade link that identifies a network location of a particular application upgrade. To avoid network congestion, a desired response factor is determined that indicates how many devices should be allowed to respond to the notification and access the identified network location at any particular time. In an aspect, the processing logic 202 operates to determine response factors associated with any of the notifications.

At block 606, one or more notification messages are assembled. For example, a notification message is formatted as shown in FIG. 3. In an aspect, the processing logic 202 operates to assemble one or more notification messages.

At block 608, the notification messages are broadcast over a network. For example the notification messages are broadcast over a broadcast channel provided by a communication network so that devices listening on the broadcast channel can receive the notification messages. In an aspect, the transceiver logic 208 operates to broadcast the notification messages over the broadcast channel 214 within a predefined delivery window.

At block 610, a test is performed to determine if any of the notification messages need to be re-broadcast. For example, a notification message may have a selected broadcast periodicity that requires the message to be re-broadcast at selected intervals. In another aspect, if a selected response to a notification message is not received, then the notification message is re-broadcast until the desired response is received. In an aspect, the processing logic 202 operates to determine if any notification message is to be re-broadcast based on a periodicity factor or desired device response. If a notification message is to be re-broadcast, the method proceeds to block 608. If it is determined that a re-broadcast is not necessary, the method stops at block 612.

It should be noted that the method 600 illustrates just one implementation and that changes, additions, deletions, or rearrangements of the described functions may be made without deviating from the scope of the described aspects.

Figure 7:
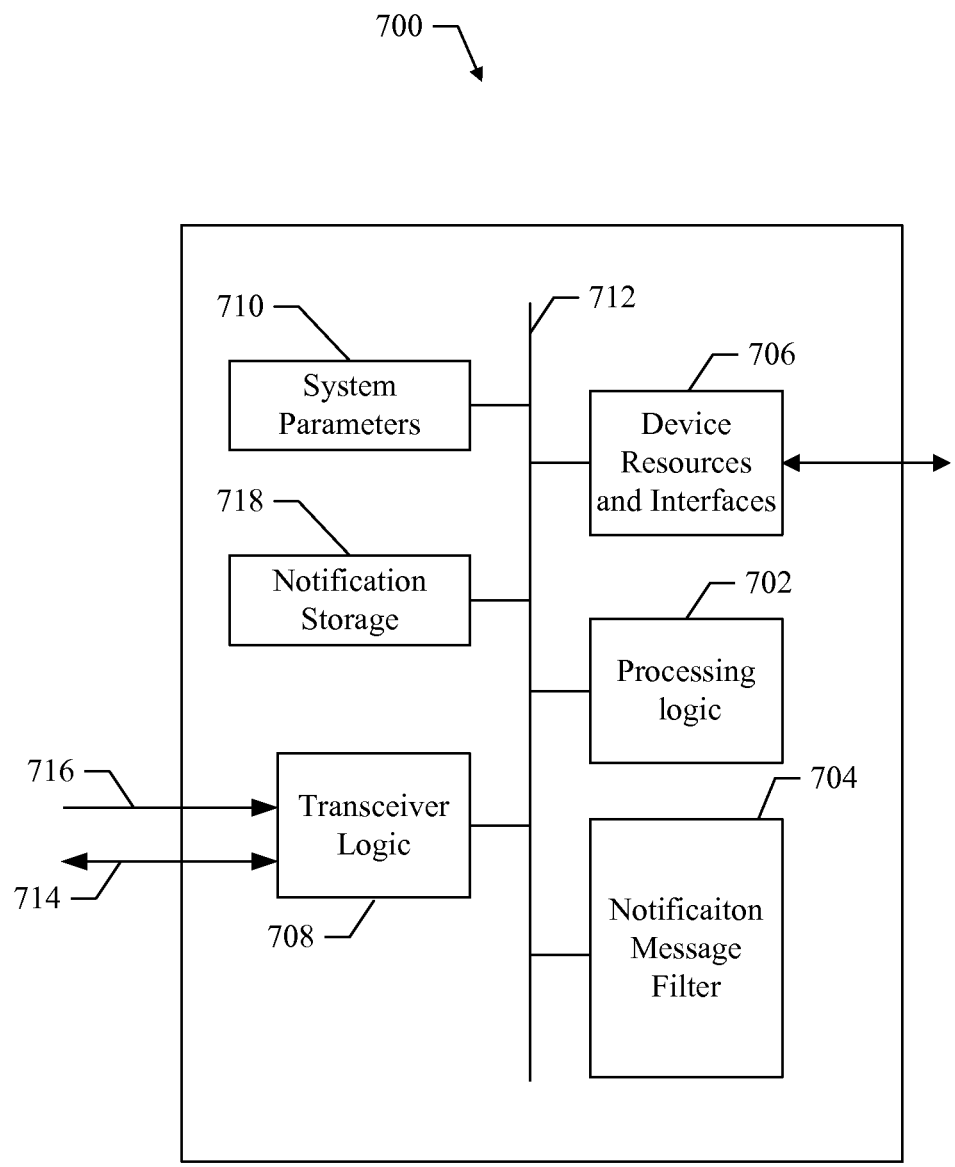
FIG. 7 shows a device suitable for use in aspects of a notification system.

FIG. 7 shows a device 700 suitable for use in aspects of a notification system. For example, the device 700 is suitable for use as the device 112 shown in FIG. 1. The device 700 comprises processing logic 702, notification message filter 704, device resources and interfaces 706, transceiver logic 708, system parameters 710, and notification storage 718 all coupled to a data bus 712. It should be noted that the device 700 is just one implementation and that other implementations are possible within the scope of the aspects.

The processing logic 702 comprises a CPU, processor, gate array, hardware logic, memory elements, virtual machine, software, and/or any combination of hardware and software. Thus, the processing logic 702 generally comprises logic to execute machine-readable instructions and to control one or more other functional elements of the device 700 via the data bus 712.

The device resources and interfaces 706 comprise hardware and/or software that allow the device 700 to communicate with internal and external systems. For example, internal systems may include mass storage systems, memory, display driver, modem, or other internal device resources. The external systems may include user interface devices, displays, keypad, printers, disk drives, or other local devices or systems. Thus, the device resources and interfaces 706 operate to allow notifications to be rendered in any suitable fashion on the device 700 to alert a device user. Furthermore, the device resources and interfaces 706 operate to allow user inputs that can be passed to the notification message filter 704.

The transceiver logic 708 comprises hardware and/or software that operate to allow the device 700 to transmit and receive data and other information with external devices or systems. For example, the transceiver logic 708 comprises broadcast logic that operates to allow the device 700 to receive broadcast transmissions over a broadcast channel 716. The transceiver logic 708 also comprises unicast logic that operates to allow the device 700 to transmit and receive information over a unicast channel 714. Thus, the device 700 is able to communicate with network entities, such as a broadcast server or an upgrade server.

The system parameters 710 comprise parameters that are associated with the operation of the device on a distribution network. For example, the parameters comprise device identifiers, subscription information, application information, such as types and versions, and any other parameters or related information. The system parameters 710 are stored in any suitable memory and may be accessed, updated, or otherwise modified by the processing logic 702.

The notification storage 718 comprises any suitable memory operable to store notification information received in filtered notification messages. For example, filtered notification messages may be stored for later viewing.

The notification message filter 704 comprises a CPU, processor, gate array, hardware logic, memory elements, virtual machine, software, and/or any combination of hardware and software. In an aspect, the notification message filter 704 operates to filter notification messages received over the broadcast channel 716. For example, the notification messages comprise parameters that may be filtered based on the system parameters 708 to determine notification messages that are targeted to the device 700. For example, a device identifier associated with a received notification message is processed to determine if it matches a device identifier stored in the system parameters 708. If a match is determined, then the received notification message is determined to be a filtered notification message and is further processed by the processing logic 702. If no match occurs, the notification message is ignored.

In another aspect, the notification message filter 704 operates to filter notification messages received over the broadcast channel 716 based on received user input. For example, the notification messages comprise parameters that may be filtered based on user input received using the device resources and interfaces 706. The parameters provided by the user input are used to determine notification messages that are to be processed or ignored by the device. For example, the user input may specify that only emergency alerts are to be processed by the device. If a received notification message is not associated with an emergency alert, then the message is ignored. The mechanism allows a device user input preferences that are used to determine which alerts are to be processed and which are to be ignored. Thus, received notification messages may be filtered by the notification message filter 704 based on any parameter stored in the system parameters or based on user inputs to determine filtered notification messages that are to be further processed.

During operation, notification message may be periodically broadcast during a particular deliver window. Thus, the device 700 may receive the same notification multiple times. To avoid displaying previously received notifications to the user, the sequence number of each notification is saved in the notification storage 718 for a selected time period. If a notification message has arrived with the same sequence number as a previous notification message, the newly received message will be ignored. For example, whenever the device 700 receives a notification message, it will know if the notification message has already been received or not by comparing its sequence number with saved sequence numbers. If the sequence number of the notification message has not been saved, the device 700 considers that it is a new notification message and processes it accordingly. If the sequence number of the new notification message exists in the device, the notification message will be discarded.

In an aspect, the processing logic 702 operates to notify and guide the device user to view any received notification messages. The processing logic 702 also operates to allow users to delete any received notifications. In an aspect, the processing logic 702 provides an automated memory-driven method for removing notifications. For example, when the number of stored notifications on the device 700 reaches a selected number and a new notification arrives, the oldest notification will be deleted. In another aspect, if the language of a received notification message is different from the preferred language specified for the device 700, the notification will not be displayed on the device.

During operation, the device 700 operates to receive notification messages over the broadcast channel 716. For example, the transceiver logic 708 operates to receive notification messages and pass them to the notification message filter 704. The notification message filter 704 operates to process the received notification messages based on the system parameters 710 and/or user input parameters to determine filtered notification messages that are to be processed by the device 700. For example, a received notification message may have a device identifier, region identifier, application identifier, or other parameters that match or otherwise qualify the message (based on the system parameters 710) to pass through the filter 704. The processing logic 702 then processes those filtered notification messages that pass through the filter 704. In an aspect, a filtered notification message may comprise an application upgrade notification having an associated upgrade link. The processing logic 702 then operates to obtain the upgrade by accessing the provided upgrade link.

Once received notification message are filtered and processed, the device 700 will notify users of the notification. For example, the processing logic 702 renders notifications on the device using the device resources and interfaces 706. Since notification messages may be sent multiple times during the notification delivery window, the device 700 operates to eliminate duplicate notifications to users if any. Alternatively, the filtered notification messages may be saved in the notification storage 718 for later viewing, or notification messages can be removed by the user. In an aspect, a user filtering mechanism for the notifications can be added. For example, depending on the notification type, the user can choose which type of notification should be ignored.

In an aspect, the notification system comprises program instructions stored on a computer-readable medium, which when executed by at least one processor, such as the processing logic 702, operate to provide the functions of the notification system described herein. For example, instructions may be loaded into the device 700 from a computer-readable media, such as a floppy disk, CDROM, memory card, FLASH memory device, RAM, ROM, or any other type of memory device or computer-readable media that interfaces to the device 700. In another aspect, the instructions may be downloaded into the device 700 from a network resource that interfaces to the device 700. The instructions, when executed by the processing logic 702, provide one or more aspects of a notification system as described herein.

Figure 8:
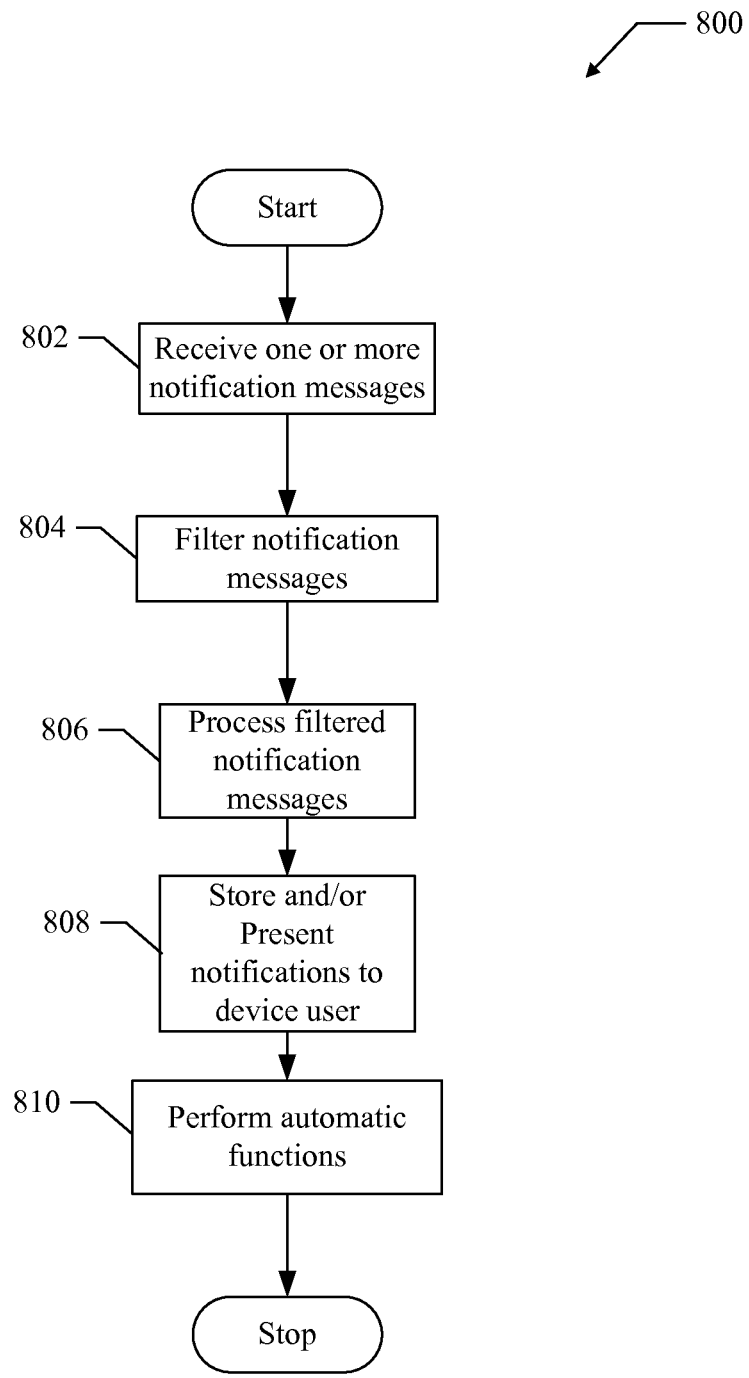
FIG. 8 shows a method for operating a device suitable for use in aspects of a notification system.

FIG. 8 shows a method 800 for operating a device in an aspect of a notification system. For clarity, the method 800 will be described with reference to the device 700 shown in FIG. 7. In one or more aspects, the processing logic 702 executes program instructions to control the device 700 to perform the functions described below.

At block 802, one or more notification messages are received. For example, in an aspect, the transceiver logic 702 receives the notification messages over the broadcast channel 716.

At block 804, the received notification messages are filtered. For example, the notification messages are filtered to determine if they are targeted to the device 700. In an aspect, a received notification message is filtered based on parameters associated with the message. For example, a device identifier, region identifier, sequence number, application version, or other parameter associated with a received notification message is compared to parameters stored in the system parameters 710. For example, a notification message will pass through the filter if the device identifier in the notification message matches a device identifier stored in the system parameters 710.

In another aspect, received notification messages are filtered based on user input parameters. For example, a device user provides user filter parameters using the device resources and interfaces 706. The notification message filter operates to filter received notifications using the user filter parameters. Notification messages that do not pass through the filter are ignored. In an aspect, the notification message filter 704 operates to filter the received notification messages and pass filtered notification messages to the processing logic 702 for further processing.

At block 806, the filtered notification messages are processed. In an aspect, the processing logic 702 operates to process a filtered notification message so that parameters in the filtered notification message are used to update the system parameters 710. For example, a price change, blackout parameter, or other parameters in the filtered notification message is used to update the system parameters 710.

At block 808, the processed notifications are presented to the device user or stored for later viewing. For example, the processing logic 702 operates to render information about processed notifications to the device user through the device resources and interfaces 706. In another aspect, the processed notifications are stored in the notification storage 718 for later viewing.

At block 810, automatic functions are performed. For example, the processing logic 702 operates to determine an upgrade link in a filtered notification message and automatically contacts a network entity at that link to obtain upgrade information. For example, the filtered notification message comprises an application notification that indicates that a particular application has been upgraded. As part of the filtered notification message, the application notification is associated with an upgrade link address. The processing logic 702 operates to use the upgrade link address to contact a network entity to retrieve the application upgrade. Thus, the processing logic 702 automatically performs an upgrade function based on information in the filtered notification message. It should be noted that any type of interactive functionality may be automatically performed based on information in the filtered notification message.

Thus, the method 800 operates to provide aspects of a notification system for use at a device. It should be noted that the method 800 illustrates just one implementation and that changes, additions, deletions, or rearrangements of the described functions may be made without deviating from the scope of the described aspects.

Figure 9:
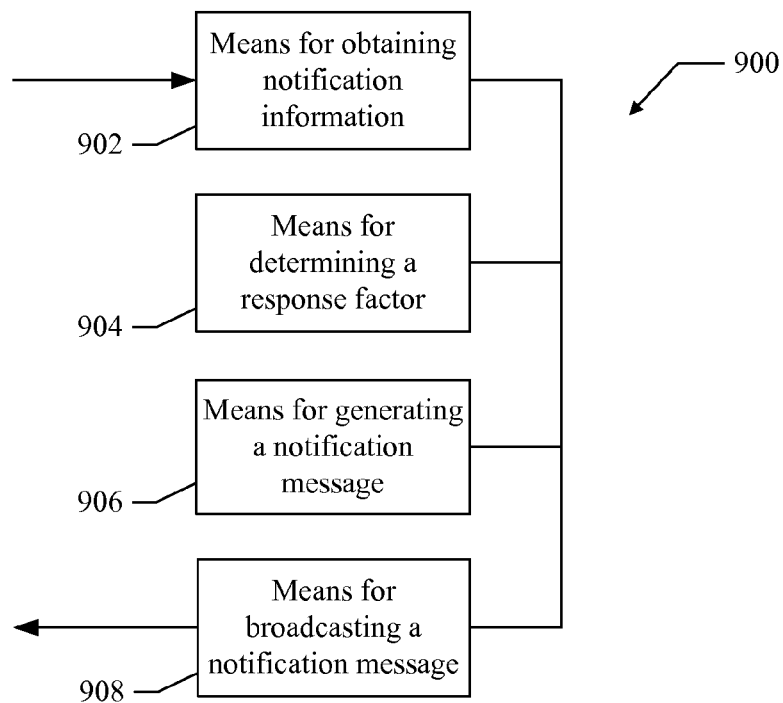
FIG. 9 shows a server suitable for use in aspects of a notification system.

FIG. 9 shows a server 900 suitable for use in aspects of a notification system. The server 900 comprises means 902 for obtaining notification information. For example, in an aspect, the means 902 comprises the notification provider interface 206.

The server 900 also comprises means 904 for determining a response factor. For example, in an aspect, the means 904 comprises the processing logic 202.

The server 900 also comprises means 906 for generating a notification message. For example, in an aspect, the means 906 comprises the processing logic 202.

The server 900 also comprises means 908 for broadcasting a notification message. For example, in an aspect, the means 908 comprises the transceiver logic 208.

Figure 10:
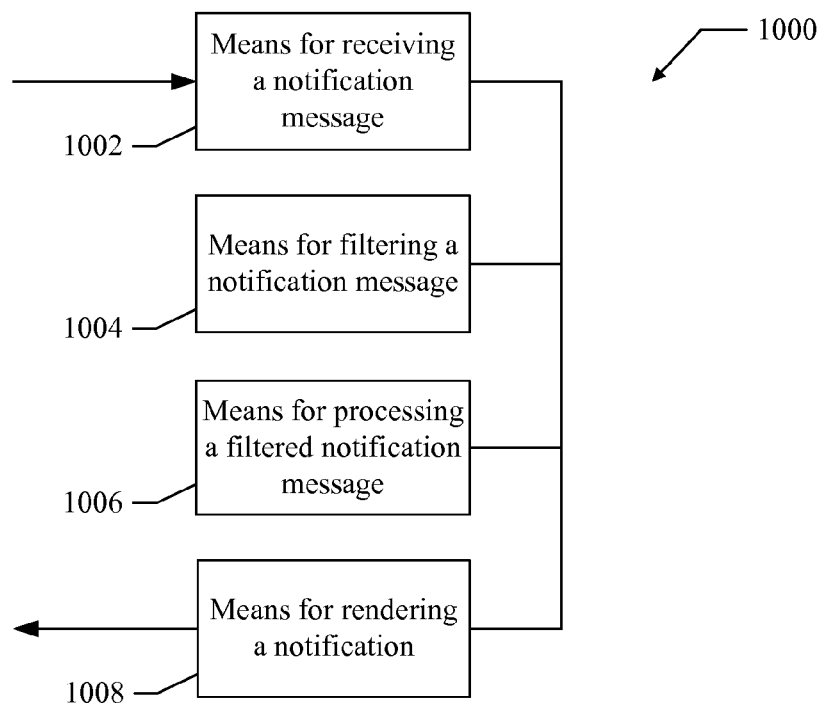
FIG. 10 shows a device suitable for use in aspects of a notification system.

FIG. 10 shows a device 1000 suitable for use in aspects of a notification system. The device 1000 comprises means 1002 for receiving a notification message. For example, in an aspect, the means 1002 comprises the transceiver logic 708.

The device 1000 also comprises means 1004 for filtering a notification message. For example, in an aspect, the means 1004 comprises the message filter 704.

The device 1000 also comprises means 1006 for processing a filtered notification message. For example, in an aspect, the means 1006 comprises the processing logic 702.

The device 1000 also comprises means 1008 for rendering a notification. For example, in an aspect, the means 1008 comprises the device resources and interfaces 706.

Thus, the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while one or more aspects of a notification system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method of providing content notifications to devices in a wireless communication system, comprising:
   obtaining notification information regarding content available to a first group of mobile devices in a wireless network, wherein the content available comprises an application upgrade;
   generating a notification message comprising the notification information and an identifier associated with a second group of mobile devices, where the second group of mobile devices is a subset of the first group of mobile devices; and
   broadcasting the notification message over the wireless network to cause mobile devices of the second group to retrieve the content over the wireless network.

2. The method of claim 1, wherein the identifier is selected to control a response factor.

3. . The method of claim 1, wherein the identifier is selected such that a selected number of mobile devices will retrieve the content at a particular time.

4. The method of claim 1, wherein the identifier is selected to avoid congestion of the wireless network.

5. The method of claim 1, wherein the notification message is generated such that mobile devices not in the second group receiving the notification message ignore the message.

6. The method of claim 1, wherein the notification message comprises a network location for retrieving the content.

7. The method of claim 1, further comprising:
   rebroadcasting the notification message over the wireless network until a desired response rate is received from the second group of mobile devices.

8. The method of claim 1, wherein the identifier comprises at least one of a device identifier, a region identifier, an application identifier, a sequence number and an application version.

9. A method of receiving content notifications in a wireless communication system, comprising:
   receiving, in a wireless network, a notification message comprising notification information regarding content available to a first group of mobile devices in the wireless network and an identifier associated with a second group of mobile devices, where the second group of mobile devices is a subset of the first group of mobile devices; and
   retrieving content from a network in response to being one of the second group of devices, wherein the content comprises an application upgrade.

10. The method of claim 9, further comprising:
    filtering the received notification message based on the identifier to determine whether a recipient mobile device is one of the second group of devices.

11. The method of claim 10, wherein filtering the received notification message further comprises filtering based on one or more user-input parameters.

12. The method of claim 10, further comprising:
    ignoring the received notification message when the recipient mobile device is not one of the second group of devices.

13. The method of claim 9, wherein the notification message comprises a network location for retrieving the content, and retrieving content from a network comprises retrieving the content from the network location.

14. The method of claim 13, wherein the network location comprises an interactive link to enable retrieval of the content at a specific location on a network.

15. The method of claim 9, wherein the identifier comprises at least one of a device identifier, a region identifier, an application identifier, a sequence number and an application version.

16. An apparatus for providing content notifications to devices in a wireless communication system, the apparatus comprising:
    a notification provider interface configured to obtain notification information from at least one notification provider;
    a transceiver configured to broadcast notification messages over a wireless network to a plurality of mobile devices; and
    a processor, coupled to the notification provider interface and the transceiver, and configured with processor-executable instructions to perform operations, comprising:
       obtaining notification information via the notification provider interface regarding content available to a first group of mobile devices in a wireless network, wherein the content available comprises an application upgrade;
       generating a notification message comprising the notification information and an identifier associated with a second group of mobile devices, where the second group of mobile devices is a subset of the first group of mobile devices; and
       broadcasting, via the transceiver, the notification message over the wireless network to cause mobile devices of the second group to retrieve the content over the wireless network.

17. The apparatus of claim 16, wherein the processor is configured with processor-executable instructions to perform operations such that the identifier is selected to control a response factor.

18. The apparatus of claim 16, wherein the processor is configured with processor-executable instructions to perform operations such that the identifier is selected such that a selected number of mobile devices will retrieve the content at a particular time.

19. The apparatus of claim 16, wherein the processor is configured with processor-executable instructions to perform operations such that the identifier is selected to avoid congestion of the wireless network.

20. The apparatus of claim 16, wherein the processor is configured with processor-executable instructions to perform operations such that the notification message is generated such that mobile devices not in the second group receiving the notification message ignore the message.

21. The apparatus of claim 16, wherein the processor is configured with processor-executable instructions such that the notification message comprises a network location for retrieving the content.

22. The apparatus of claim 16, wherein the processor is configured with processor-executable instructions to perform operations further comprising:
rebroadcasting the notification message over the wireless network until a desired response rate is received from the second group of mobile devices.

23. The apparatus of claim 16, wherein the processor is configured with processor-executable instructions to perform operations such that the identifier comprises at least one of a device identifier, a region identifier, an application identifier, a sequence number and an application version.

24. A mobile device, comprising:
a transceiver;
a memory; and
a processor, coupled to the transceiver and the memory, and configured with processor-executable instructions to perform operations comprising:
receiving, in a wireless network, a notification message comprising notification information regarding content available to a first group of mobile devices in the wireless network and an identifier associated with a second group of mobile devices, where the second group of mobile devices is a subset of the first group of mobile devices; and
retrieving content from a network in response to the mobile device being one of the second group of devices, wherein the content comprises an application upgrade.

25. The mobile device of claim 24, wherein the processor is configured with processor-executable instructions to perform operations further comprising:
filtering the received notification message based on the identifier to determine whether the mobile device is one of the second group of devices.

26. The mobile device of claim 25, wherein the processor is configured with processor-executable instructions to perform operations such that filtering the received notification message further comprises filtering based on one or more user-input parameters.

27. The mobile device of claim 25, wherein the processor is configured with processor-executable instructions to perform operations further comprising:
ignoring the received notification message when the recipient mobile device is not one of the second group of devices.

28. The mobile device of claim 24, wherein the processor is configured with processor-executable instructions to perform operations such that the notification message comprises a network location for retrieving the content, and retrieving content from a network comprises retrieving the content from the network location.

29. The mobile device of claim 28, wherein the processor is configured with processor-executable instructions to perform operations such that the network location comprises an interactive link to enable retrieval of the content at a specific location on a network.

30. The mobile device of claim 24, wherein the processor is configured with processor-executable instructions to perform operations such that the identifier comprises at least one of a device identifier, a region identifier, an application identifier, a sequence number and an application version.

31. An apparatus for providing content notifications to devices in a wireless communication system, the apparatus comprising:
means for obtaining notification information regarding content available to a first group of mobile devices in a wireless network, wherein the content available comprises an application upgrade;
means for generating a notification message comprising the notification information and an identifier associated with a second group of mobile devices, where the second group of mobile devices is a subset of the first group of mobile devices; and
means for broadcasting the notification message over the wireless network to cause mobile devices of the second group to retrieve the content over the wireless network.

32. A mobile device, comprising:
means for receiving, in a wireless network, a notification message comprising notification information regarding content available to a first group of mobile devices in the wireless network and an identifier associated with a second group of mobile devices, where the second group of mobile devices is a subset of the first group of mobile devices; and
means for retrieving content from a network in response to the mobile device being one of the second group of devices, wherein the content comprises an application upgrade.

33. A non-transitory computer-readable storage medium comprising processor-executable instructions that cause a processor of a content notification apparatus to perform operations comprising:
obtaining notification information regarding content available to a first group of mobile devices in a wireless network, wherein the content available comprises an application upgrade;
generating a notification message comprising the notification information and an identifier associated with a second group of mobile devices, where the second group of mobile devices is a subset of the first group of mobile devices; and
broadcasting the notification message over the wireless network to cause mobile devices of the second group to retrieve the content over the wireless network.

34. The non-transitory computer-readable storage medium of claim 33, wherein the processor-executable instructions are configured to cause the processor of the content notification apparatus to perform operations such that the identifier is selected to control a response factor.

35. The non-transitory computer-readable storage medium of claim 33, wherein the processor-executable instructions are configured to cause the processor of the content notification apparatus to perform operations such that the identifier is selected such that a selected number of mobile devices will retrieve the content at a particular time.

36. The non-transitory computer-readable storage medium of claim 33, wherein the processor-executable instructions are configured to cause the processor of the content notification apparatus to perform operations such that the identifier is selected to avoid congestion of the wireless network.

37. The non-transitory computer-readable storage medium of claim 33, wherein the processor-executable instructions are configured to cause the processor of the content notification apparatus to perform operations such that the notification message is generated such that mobile devices not in the second group receiving the notification message ignore the message.

38. The non-transitory computer-readable storage medium of claim 33, wherein the processor-executable instructions are configured to cause the processor of the content notification apparatus to perform operations such that the notification message comprises a network location for retrieving the content.

39. The non-transitory computer-readable storage medium of claim 33, wherein the processor-executable instructions are configured to cause the processor of the content notification apparatus to perform operations further comprising:
rebroadcasting the notification message over the wireless network until a desired response rate is received from the second group of mobile devices.

40. The non-transitory computer-readable storage medium of claim 33, wherein the processor-executable instructions are configured to cause the processor of the content notification apparatus to perform operations such that the identifier comprises at least one of a device identifier, a region identifier, an application identifier, a sequence number and an application version.

41. A non-transitory computer-readable storage medium comprising processor-executable instructions that cause a processor of a mobile device to perform operations comprising:
receiving, in a wireless network, a notification message comprising notification information regarding content available to a first group of mobile devices in the wireless network and an identifier associated with a second group of mobile devices, where the second group of mobile devices is a subset of the first group of mobile devices; and
retrieving content from a network in response to the mobile device being one of the second group of devices, wherein the content comprises an application upgrade.

42. The non-transitory computer-readable storage medium of claim 41, wherein the processor-executable instructions are configured to cause the processor of the mobile device to perform operations further comprising:
filtering the received notification message based on the identifier to determine whether the mobile device is one of the second group of devices.

43. The non-transitory computer-readable storage medium of claim 42, wherein the processor-executable instructions are configured to cause the processor of the mobile device to perform operations such that filtering the received notification message further comprises filtering based on one or more user-input parameters.

44. The non-transitory computer-readable storage medium of claim 42, wherein the processor-executable instructions are configured to cause the processor of the mobile device to perform operations further comprising:
ignoring the received notification message when the mobile device is not one of the second group of devices.

45. The non-transitory computer-readable storage medium of claim 41, wherein the processor-executable instructions are configured to cause the processor of the mobile device to perform operations such that the notification message comprises a network location for retrieving the content, and retrieving content from a network comprises retrieving the content from the network location.

46. The non-transitory computer-readable storage medium of claim 45, wherein the processor-executable instructions are configured to cause the processor of the mobile device to perform operations such that the network location comprises an interactive link to enable retrieval of the content at a specific location on a network.

47. The non-transitory computer-readable storage medium of claim 41, wherein the processor-executable instructions are configured to cause the processor of the mobile device to perform operations such that the identifier comprises at least one of a device identifier, a region identifier, an application identifier, a sequence number and an application version.

* * * * *